United States Patent

Berger et al.

[11] Patent Number: 5,947,361
[45] Date of Patent: Sep. 7, 1999

[54] APPARATUS FOR TRANSPORTING FABRICS AND WEB-SHAPED MATERIAL WITH AN ELECTRIC DRIVE DEVICE

[75] Inventors: Dietmar Berger, Dresden; Waldemar Strohmer, Nürnberg; Detlef Nimz, Hoyerswerda; Peter Kreisfeld, Altdorf/Weinhof, all of Germany

[73] Assignee: EMO Elektromotorenwerk Kamenz GmbH, Kamenz, Germany

[21] Appl. No.: 08/864,151

[22] Filed: May 28, 1997

[30] Foreign Application Priority Data

Jul. 25, 1996 [DE] Germany ............... 196 29 716
Mar. 11, 1997 [EP] European Pat. Off. ......... 97 104 021

[51] Int. Cl.⁶ ............... G03B 1/56; B65H 20/24; B65G 47/46; B65G 17/06
[52] U.S. Cl. ............... 226/92; 198/370.01; 198/805; 198/853; 226/110
[58] Field of Search ............... 226/92, 110; 198/468.9, 198/370.01, 805

[56] References Cited

U.S. PATENT DOCUMENTS

| | | | |
|---|---|---|---|
| 3,788,447 | 1/1974 | Stephanoff | 198/805 X |
| 4,987,830 | 1/1991 | Fukuda et al. | 226/92 X |
| 5,052,295 | 10/1991 | Suzuki et al. | 226/92 X |
| 5,147,029 | 9/1992 | Wadell | 198/805 X |
| 5,201,269 | 4/1993 | Eckert | 226/92 X |
| 5,263,414 | 11/1993 | Lehrrieder et al. | 226/92 X |
| 5,320,039 | 6/1994 | Reponty et al. | 226/92 X |
| 5,400,940 | 3/1995 | Sato et al. | 226/92 |
| 5,581,908 | 12/1996 | Theilacker | 226/92 X |
| 5,809,892 | 9/1998 | Krüger et al. | |

FOREIGN PATENT DOCUMENTS

| | | |
|---|---|---|
| 0 425 741 A1 | 5/1991 | European Pat. Off. |
| 2 021 246 | 12/1971 | Germany |
| 263 262 A1 | 12/1988 | Germany |
| 40 04 221 A1 | 9/1990 | Germany |
| 41 22 228 C2 | 1/1993 | Germany |
| 42 02 713 A1 | 8/1993 | Germany |
| 43 28 057 C1 | 12/1994 | Germany |
| 196 21 507 C1 | 9/1997 | Germany |

*Primary Examiner*—Michael R. Mansen
*Attorney, Agent, or Firm*—Frank H. Foster; Kremblas, Foster, Millard & Pollick

[57] ABSTRACT

An apparatus for transporting and for conveying fabrics, individual articles and other material, in particular for feeding web-shaped material into a machine which processes it, for example a paper web into a printing machine, with at least one conveyor element formed for engagement with the material, a guide rail, in and/or along which the conveyor element(s) can move, and a drive device comprising the conveyor element in order to convey the material into and/or through the machine via the conveyor element, wherein the drive device is formed by an electric linear motor whose secondary part or rotor device comprises and/or bears the conveyor element(s) and whose primary part or stator device is mounted in a stationary manner on the guide rail, and the guide rail is formed from a non-magnetic and non-conducting or electrically insulating material, preferably a plastics material, and comprises therein one or more electrical conductor strands to which the stator device is coupled and/or connected so as to be energized.

7 Claims, 7 Drawing Sheets

FIG. 20

APPARATUS FOR TRANSPORTING FABRICS AND WEB-SHAPED MATERIAL WITH AN ELECTRIC DRIVE DEVICE

BACKGROUND OF THE INVENTION

1. Field of the Invention

The invention relates to an apparatus for transporting and for conveying fabrics, individual articles and other material, in particular for feeding web-shaped material into a machine which processes it, for example a paper web into a printing machine, with at least one conveyor element formed for engagement with the material, a guide rail, in and/or along which the conveyor element(s) can move, and a drive device comprising the conveyor element in order to convey the material into and/or through the machine via the conveyor element.

2. Description of the Related Art

The paper web is conveyed in a certain direction by means of a driver hook in known paper feed apparatus of approximately this type. The driver hook is fastened to a chain which is moved along a guide in the conveying direction by means of a pneumatic drive. Once the paper web has been fed into the printing machine, the driver hook is disengaged from the paper web and carried manually back to the beginning of the feed region together with its drag chain. Re-engagement with the next paper web is also effected manually. However, because of the pneumatic drive means, the conveying force cannot be controlled or regulated with sufficient accuracy; this results in the risk of the paper web tearing easily, so that the feed operation has to be repeated. A further disadvantage lies in the fact that the driver hook, as a conveyor element, must be manually unhooked and carried back to the beginning of the feed region, which increases expenditure in terms of human labour and working time. In addition, the conveying chain which is connected to the driver hook requires a comparatively high level of maintenance. The "air" employed as the medium in a pneumatic drive is relatively expensive.

DE 41 22 228 C2, DE-PS 20 21 246, DD 263 262 A1 and EP 0 425 741 A1 also disclose web feed apparatus whose drive principle is based on mechanical positive and frictional engagement. This is why, and particularly in view of their numerous mobile parts, they exhibit high friction losses and high wear levels. The large number of moving parts results in a complex construction entailing high costs. The conveying stations in the apparatus according to the last-mentioned source reference require a large amount of space. Finally, the apparatus according to the above-mentioned source references entail the risk of interruptions occurring due just to slight fouling of the guide rails or traction device.

Finally, DE 196 21 507.2 which, although an older patent application, had not been published on the date of filing this application, describes a web feed apparatus for a machine which processes web-shaped material, in particular a web-fed rotary reel printing machine, in which a rail-guided traction device is driven through the direct action of magnetic forces by means of an electric linear drive and pulls the web after it. The traction device virtually forms the rotor of the electric linear drive, and the guide rail for the traction device the stator of this drive, while electrically excitable coils are arranged along the guide rail. The content of this older patent application, presumably subsequently published, is hereby included in the disclosure of the present application.

The object of the invention, with respect to a feed apparatus of the type initially mentioned, is to prevent mechanical wear and friction losses, reduce manufacturing and construction expenditure, enable the feed operation to be fully automated and increase operating safety and reliability.

BRIEF SUMMARY OF THE INVENTION

In order to solve this object in the case of a feed apparatus having the features initially mentioned, the invention proposes using for the drive device an electric linear motor whose primary part or stator device is connected to and/or integrated with the guide device for the conveyor element(s) and whose secondary part or rotor device comprises and/or bears the conveyor element(s). A magnetic travelling field can be produced in or along the guide device with the primary part, which field is used together with the secondary part or rotor device to move the conveyor element. There is no need for mechanical engagement or coupling means such as, for example, gears or chain haulage systems, which are highly susceptible to wear. The power electronics which are available today enable electromagnetic drive forces to be produced, regulated and controlled in a highly precise manner. A highly accurate adjustment of the position and speed for the paper web conveyor element is thus possible, which means that flexibility in terms of application is increased as well as operating safety and reliability. The invention in particular enables the paper web conveyor element to travel bidirectionally within its guide device.

In order to allow for the fact that the paths followed by the paper inside a printing machine curve significantly in parts, according to a special embodiment of the invention the primary part and/or secondary part of the linear motor is/are subdivided into discrete stator or rotor segments which are joined together at an angle and/or in a mobile manner, especially an articulated manner. They are therefore adapted to the paper web guide device with its substantial curvatures. The travelling field of the linear motor can thus travel along curvatures with average bending radii of as little as 50 mm (according to the paper path or the radius of a printing roller). In a special embodiment the rotor segments are coupled together via joints which allow them to move relative to one another in three dimensions. The rotor segment can as a result not only cover curves in one plane, but also additionally or simultaneously slopes extending from one plane along another plane inclined or perpendicular thereto.

According to a development of the segmental structuring concept, in order to increase the thrust to move the paper web conveyor element, the stator and/or rotor segments are arranged such that they partly overlap. The profile of the overlap region may be in the form of a rhombus or a rounded arch (like a circle or an ellipse). On the other hand, it is advantageous to arrange the stator segments at freely selectable, discrete spacings from one another in or at the guide device. It is thus possible to form curved paths with uniform stator components.

The stator and/or rotor segments are advantageously arranged at a spacing from one another which corresponds to the pole pitch of the linear motor.

In order to guarantee the electromagnetic coupling between the primary and the secondary part of the linear motor via the air gap, according to one construction of the invention the guide device is produced from a non-magnetic and non-conducting material, preferably a plastics material. A mobile carriage comprising, in particular bearing, the conveyor element and the secondary part of the linear motor may be engaged with the guide device, in particular a guide rail. It is advantageous to use roller or rolling contact bearings to support the carriage radially and axially in the guide device; these enable the secondary part together with the carriage connected thereto to be displaced with respect to the guide rail and the primary part connected thereto largely without friction or wear.

The guide rail may also perform the additional function of (co)-holding stator winding strands of the energized primary part of the linear motor. This means that the stator conductors including the earth connection are embedded, which is of advantage in terms of the safety and reliability of the feed apparatus.

Generally speaking, it is possible to use linear motors of the synchronous or asynchronous type for the invention. As it may be difficult to maintain a certain air gap in the latter case, according to current know-how it is preferable to use a synchronous linear motor in which the secondary part is preferably provided with permanent magnets to produce the exciting field. The synchronous motor is more robust, and the maintenance of precise installation boundary conditions not as critical for a synchronous motor as for an asynchronous motor.

As is known per se, the position of the secondary part of a linear motor is detected by means of appropriate sensors which—when using the synchronous type—use the field of the permanent magnets on the secondary part to determine the position.

Unlike the above-mentioned, older DE patent application, the publication of which is pending, the guide rail, which is formed from a non-magnetic and non-conducting or electrically insulating material, preferably a plastics material, comprises one or more electrical conductor strands to which the stator device is coupled and/or connected so as to be energized. A kind of "flexible" linear current conduction is achieved by placing or embedding conductors in the linear guide rail: Discrete stations of the stator device can be mounted at any desired points and at any desired spacings from one another and coupled to the conductor strands in or on the guide rail so as to be energized. Because it is made of an insulating material, the guide rail having a flexible linear current conduction of this kind can be arranged in the air gap between the stator device and the rotor device of the electric linear motor. The result is a compact and space-saving construction with the possibility of adapting the spacings between the individual stator stations at the guide rail according to the application and requirements. A further advantage lies in the possibility of rapidly detecting, repairing and/or replacing defective stations of the stator device, the overall result of which is an increase in the service quality and maintainability of the drive system and associated transport system. Since the concept according to the invention enables individual stator stations or segments to be positioned at any desired point of the guide rail, a particular result is the possibility of the stator segment spacings being any desired multiple of the pole pitch.

In order that objects of the most varied type may be quickly coupled to the electrical conductor strands of the guide rail, according to one embodiment of the invention one or more fastening means, in particular lock-in and/or snap hook elements, are provided in order, for example, to fasten the stator device or a part thereof to the guide rail or, according to another example, to mount one or more contacting elements on the guide rail. These contacting elements are in this case arranged and/or formed in or on the fastening means and serve to connect objects or elements which can be electrically operated to the electrical conductor strands of the guide rail. Particularly where a stator device with one or more windings to be energized is concerned, the contacting elements may be useful for terminating the stator winding starts and/or finishes, in which case these are arranged or formed in or on the stator device and/or the fastening means and can be brought into contact and/or engagement with the conductor strands of the guide rail when the fastening means are operated in order to establish an electrical connection with the stator winding starts and/or finishes.

A space-saving construction is achieved if, according to another embodiment of the invention, the fastening means are structurally integrated with the stator device, in particular its frame, and/or formed with projecting, resilient snap hooks for embracing the guide rail. This at the same time facilitates handling and maintenance, as the snap hooks enable individual stator stations to be easily and quickly mounted on the guide rail and brought into contact with the electrical conductor strands.

The guide rail is advantageously composed in sections of separate parts, instead of just a single piece. This results in butt seams or joints between the respective connection regions which also pass through the electrical conductor strands in the guide rail and may lead to electrical contact difficulties. This problem is solved by a special embodiment of the invention in that a respective separate fastening means with one or more contacting elements is arranged on both sides of the butt joint, and the contacting elements are electrically connected by one or more bridging conductors on different sides of the butt seam Current can thus flow exclusively or just additionally or redundantly from one guide rail section via the bridging conductor to the adjacent guide rail section while bypassing the butt joint. This bridging can be effected in a manually rapid and convenient manner with the aid of the fastening means, which can preferably be snapped on.

In order to enable web-shaped material to be fed along, for example, different web paths or tracks within the printing machine, the older DE patent application which was mentioned at the outset and the publication of which is pending proposes at least one switchable set of points comprising a disc which can rotate via an operating element and on which sections of the guide rail curved in different directions are arranged. In contrast, a proposal according to one embodiment of the invention for changing the direction or track for the secondary part with conveyor element lies in providing the switchable points with sections or segments of the primary part or stator device or other electromagnetic means which are associated with each of the branching points directions or tracks and can be operated or shifted to determine the direction. This represents a structurally simple manner of utilising the "infrastructure"—which is in any case provided for the electric linear drive—of electromagnetic means and elements.

The invention also offers the possibility of shifting mobile sections or segments of the points individually or together transversely or obliquely to the respective points track or to the stationary points sections and segments in a linear guide in order to change the track or path for the secondary part and the conveyor means connected thereto. This offers the particularly advantageous possibility of also using an electric linear drive for this shifting operation and in so doing making use of the electromagnetic "infrastructure" which is already provided for driving the conveyor elements.

In the initially mentioned, older DE patent application, the publication of which is pending, projecting guide elements, which are guided in a corresponding groove formed in the guide rail, are molded onto the traction device. The guide rail has a T-shaped interior space, and the groove corresponding to the guide elements forms the upper part or head of the T-profile. Diverging from this, according to a special embodiment of the invention, which is also based on a sliding guide for the secondary part or rotor, it is proposed that the sliding guide be formed by complementary engagement elements in or on the guide rail on one hand and in the secondary part and/or the conveyor elements on the other, these being provided on both boundary sides of the guide rail or movement track.

Further details, features, advantages and effects based on the invention will emerge from the claims and the following description of preferred embodiments of the invention and the drawings, in which:

DETAILED DESCRIPTION OF THE INVENTION

Figure 1:
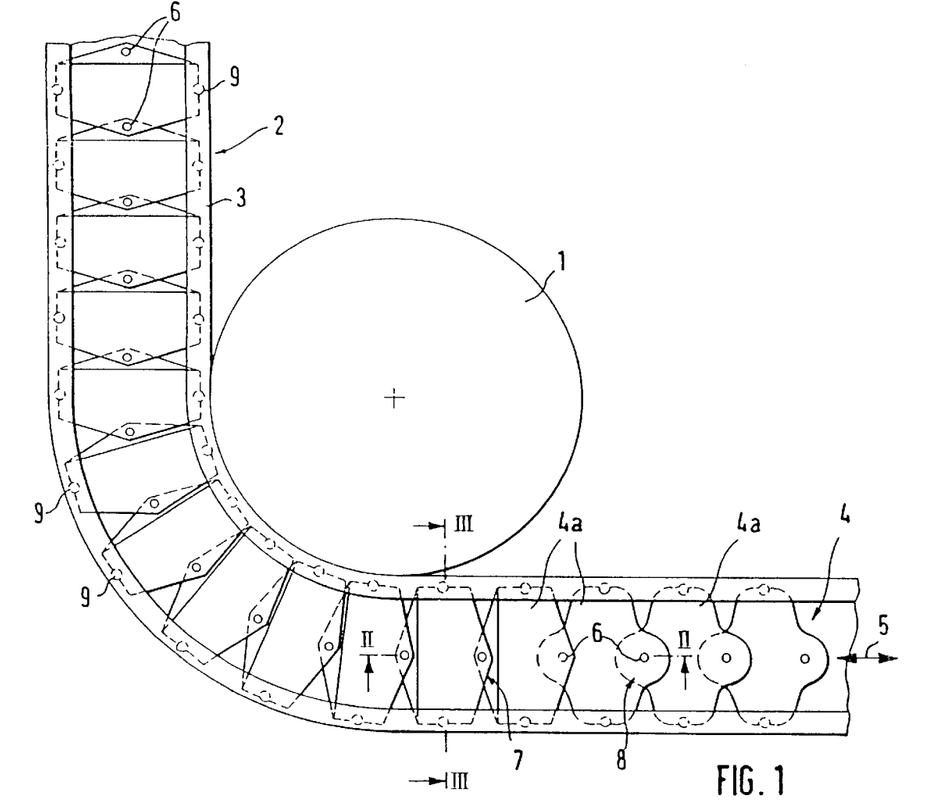
FIG. 1 is a plan view onto a plant or arrangement according to the invention for feeding a paper web into a printing machine.

According to FIG. 1, a guide device 2 is guided approximately at an angle of 90° around a printing roller 1. It consists essentially of a guide rail 3, within which a mobile, multi-member carriage 4 is held. This is composed of its plurality of rotor segments 4a, which are joined together in an articulated manner via rivet joints 6 at both ends in the direction of the conveyor device 2. They also overlap partly in this region, whether in the form of a rhombus 7 or in a rounded-arched form 8. The electromagnetic range of action is thus covered, so as to promote the thrust of the magnetic travelling field, which is produced inside the guide rail 3, on the carriage 4. Driver hooks (not shown) may also be mounted at the rivet joints 6 to pull the paper web (not shown) into the printing machine. Once the hook has been disengaged from the paper web, the carriage can be moved back into its original position. The rotor carriage 4 is preferably provided with permanent magnets in order to establish the electromagnetic coupling with the magnetic travelling field within the guide rail 3. Ball bearings 9 are arranged at the inner wall of the guide rail 3 on both sides for each rotor segment 4a to provide axial and radial support for the carriage 4, by means of which bearings the carriage 4 can travel bidirectionally, as indicated by the arrows 5.

Figure 2:
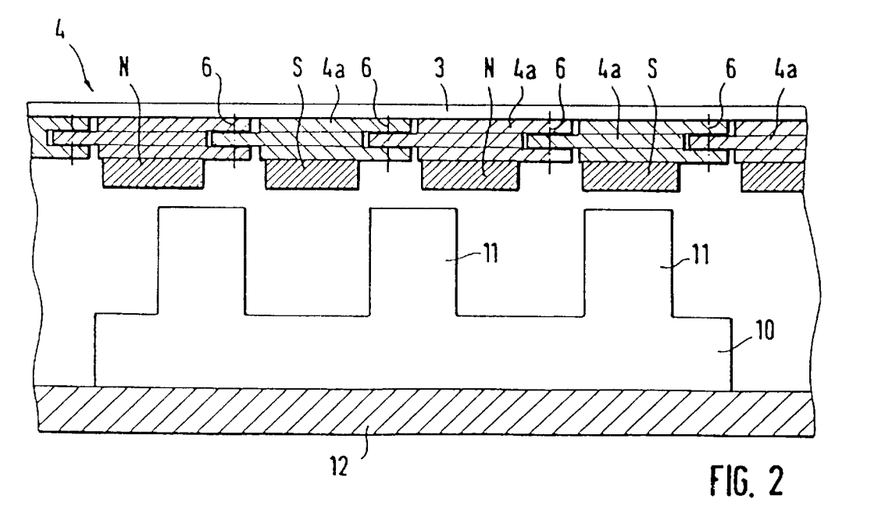
FIG. 2 is a longitudinal section along the line II—II in FIG. 1.

According to FIG. 2, a respective permanent magnet element N, S is mounted with alternating polarity on the respective underside of each rotor segment 4a. The arrangement corresponds to the synchronous motor type, and the permanent magnets N, S may be rare earth magnets. The primary part or stator device 10 with the pole elements 11 is arranged below the rotor carriage 4.

Figure 3:
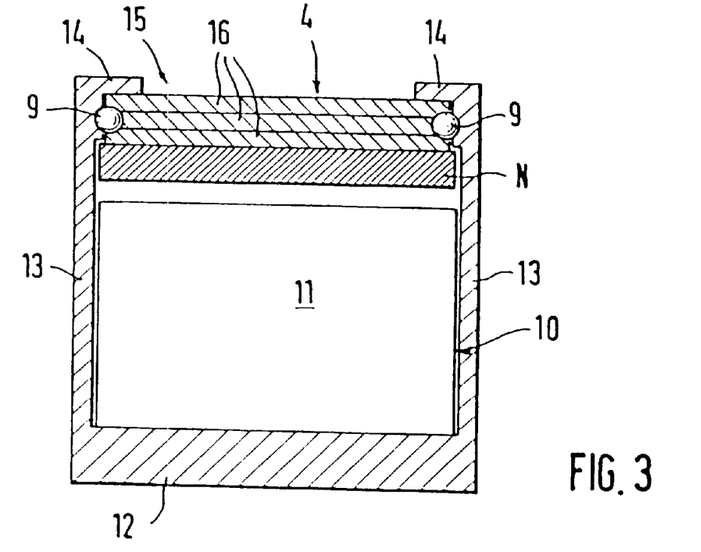
FIG. 3 is a cross section along the line III—III in FIG. 1.

As shown more clearly in FIG. 3, a support frame 12 serves to hold the entire arrangement with the primary part 10 and secondary part or rotor carriage 4. The support frame 12 has an approximately rectangular U-profile in cross section, the two side pieces 13 comprising inward directed projections 14 at their top or free ends in the manner of a C-profile, thus embracing the linear motor arrangement together with the ball bearings 9 like a clamp.

Figure 4:
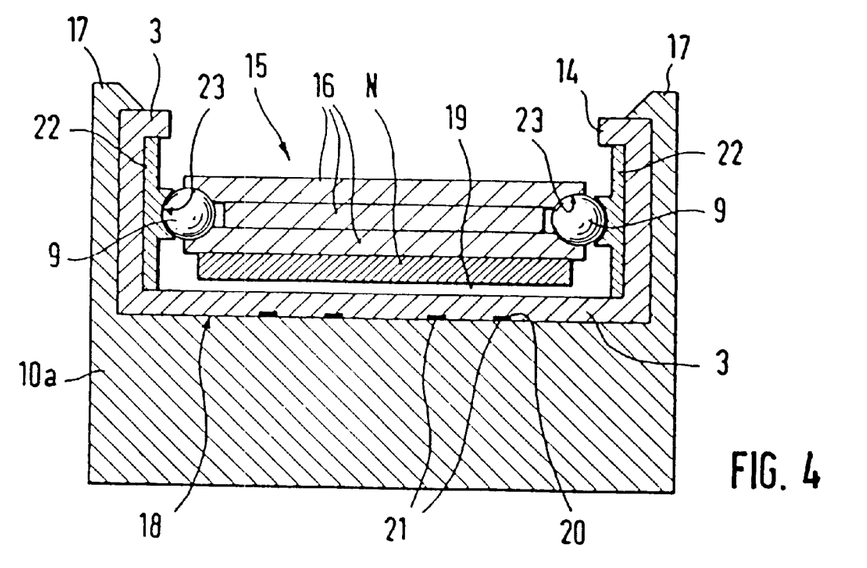
FIG. 4 is a cross section modified with respect to FIG. 3.

According to FIG. 4 (as well as FIG. 3), the magnetic back-circuit device 15 is composed of a plurality of sheet-metal layers 16 and arranged on the top side of a permanent magnet element N or S.

According to the special construction shown in FIG. 4, the guide rail 3 is formed as a C-type profile which is open at the top and onto which the primary part or stator device 10 is pressed and locked by means of complementary snap hooks 17 disposed on both sides. According to a preferred construction, individual stator segments 10a corresponding, for example, to the pole pitch evident in FIG. 2, are mounted on the closed, long underside 18 of the guide rail 3, which preferably consists of a plastics material, at freely selectable, yet discrete spacings. Depressions 20 are formed in the underside 18, which has a long cross section and is distant from the side of the guide rail 3 facing the air gap 19, in which depressions copper tracks are set as electrical conductor strands 21 to energise the stator segment 10a. The stator segment 10a is mounted on the underside 18 of the guide rail 3 such that the conductor strands 21 are also embedded by the basic stator body. Regulated energisation of the stator segments 10a produces a magnetic travelling field which is followed by the rotor carriage 4. The carriage 4 can travel by means of the ball bearings 9 which are arranged on both sides and for which appropriately arched or rounded running surfaces 23 are formed both in the respective facing side of the back-circuit device 15 and in wall elements 22 at opposite inner surfaces of the guide rail 3. These serve as inner and outer races of the ball bearing 9.

The speed, power and direction of movement of the rotor carriage can be regulated by appropriately regulating the voltages or current flowing through the copper tracks or conductor strands 21 in terms of frequency, amplitude and phase. Discrete spacings at any desired multiple of a pole pitch are to be maintained between the individual stator segments 10a.

The invention is not restricted to the described embodiments: The individual rotor segments 4a may also be connected by crimps formed in the back-circuit plates, in which case the spacings of different rotor segments may overlap. The overlap is represented or obvious in FIGS. 1 and 2 by means of the rivet joints 6.

Figure 5:
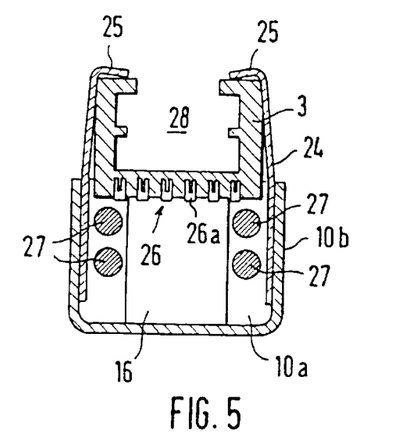
FIG. 5 is a cross-sectional representation of a modified construction of the invention with guide rail and stator segment embracing the latter.
Figure 6:
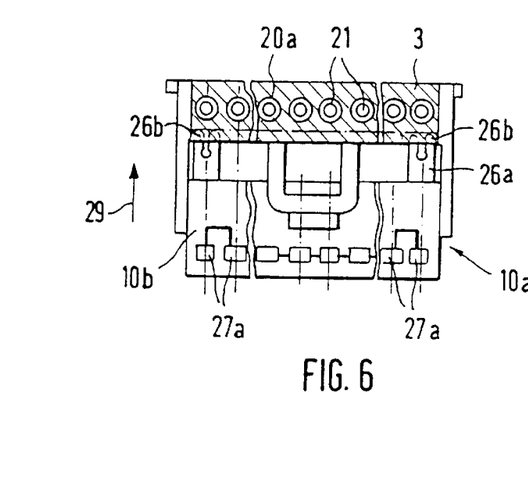
FIG. 6 is a cross-sectional, detailed representation of the arrangement for fastening the stator to the guide rail.

According to FIG. 5, fastening means in the form of spring clips 24 are mounted at opposite inner surfaces of a stator frame 10b of the stator segment 10a, which clips project from the U-shaped cross section of the stator frame 10b and embrace between them the guide rail 3, which in the example is made of a plastics material. At their top, free ends the spring clips 24 comprise respective hook ends 25 which are bent inwards, face one another and by means of which the fastening arrangement with the spring clips 24 can be snapped onto the guide rail 3, as it were, in an easy operation. In the course of this spring-elastic snap-on operation contacting elements 26, for example in the form of insulation displacement terminals 26a, are pushed through the plastics material and thereby brought into electrically contacting engagement with electrically live conductor strands (not drawn in FIG. 5). This is effected by scissor-like ends 26b of the insulation displacement terminals 26a, which have cut and passed through the plastics material of the guide rail 3 as far as the copper tracks or conductor strands embedded therein, at least partly passing through or cutting into the latter due to their cutting action. Reliable electrical contact is thus guaranteed. At their ends which are distant from the cutting ends the insulation displacement terminals 26a are connected to the starts and finishes of end windings 27 of the stator segment 10a. Energisation of the stator can consequently be effected in a manually simple manner at practically any desired point of the guide rail 3 in this arrangement by snapping the stator element 10a via the spring clips 24 with hook ends 25 onto the guide rail 3 and via the contacting elements 26 in the form of insulation displacement terminals 26a. The free interior space 28, which is surrounded by the guide rail, serves to hold and guide the rotor device or secondary part with the carriage and/or rotor segment within the framework of the electric linear drive. According to FIG. 6, the electrical conductor strands 21, being completely surrounded by plastics material, are embedded in the guide rail 3, which in this embodiment is constructed without a C-type profile and without an inner cavity. An insulation displacement terminal 26a is associated with each conductor strand 21 by way of its slotted or scissor-like end 26b. At the other end they are in each case connected to associated stator winding starts and/or finishes 27a. By moving the stator with its stator frame 10b in the press-on direction 29 against the underside of the guide rail 3, the insulation displacement terminal points 26b cut through the plastics material of the guide rail until they cut into the electrical conductor strands 21 and snap or lock into the latter. This is a reliable way of fastening the stator segment 10a and connecting it to the electrical conductor strands 21 as an alternative or in addition to the fastening version according to FIG. 5.

Figure 7:
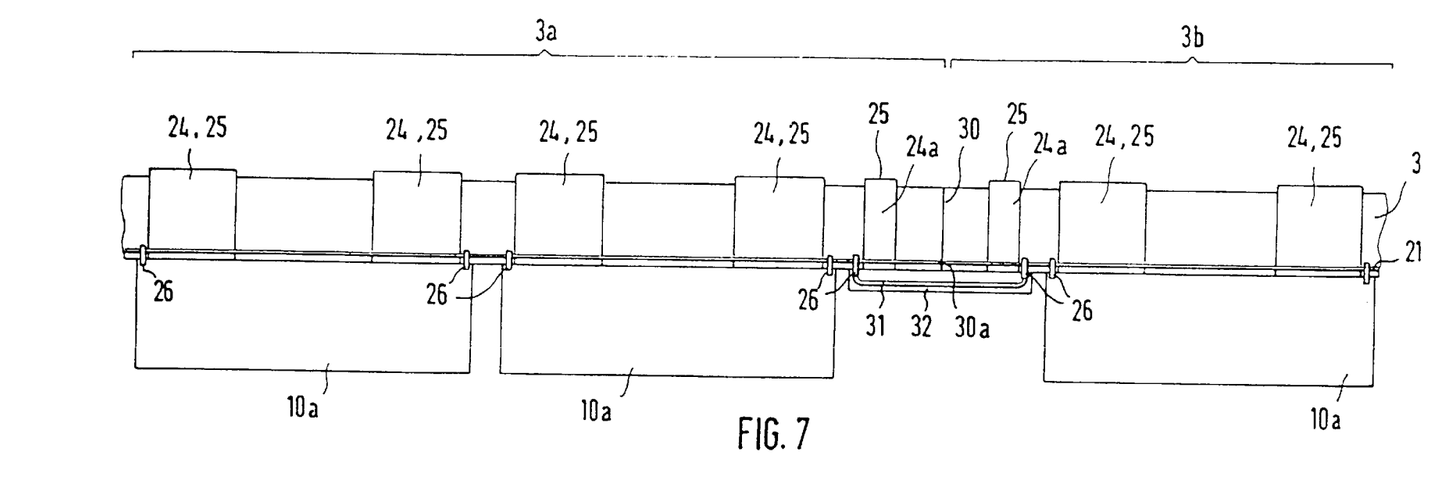
FIG. 7 is a longitudinal view of the total arrangement with a guide rail subdivided into individual sections, stator elements fastened thereto and associated fastening means.

FIG. 7 is a longitudinal section showing the entire arrangement with a plurality of discrete stator stations or segments 10a and associated fastening or snap-on means 24, 25 in detail, the guide rail 3 being subdivided into sections 3a, 3b. As is also obvious from the plan view according to FIG. 8, the two sections 3a, 3b form in the region in which they are set together at their end faces a butt joint or seam 30, which also passes through the electrical conductor strand 21 with its bottom section 30a. This may lead to electrical contact difficulties or interruptions in current conduction. This is remedied by using a bridging conductor 31, the two ends of which are connected to the electrical conductor strand 21 at a respective side of the butt seam 30 or butt seam bottom section 30a by means of a specially provided insulation displacement terminal 26. Specially formed spring clips 24a with hook ends 25 are provided to make these insulation displacement terminals 26 cut through the guide rail 3 and bring them into contacting engagement with the conductor strand 21; these special spring clips 24a do not have any stator means and are not connected to a stator segment. Otherwise the special spring clips 24a are formed analogously to those according to FIG. 5 with hook ends 25 and a frame at the underside. In order to protect it against external influences, the bridging conductor 31 between the two contacting elements 26 or insulation displacement terminals 26a is accommodated in a plastics bed 32 disposed at the underside of the guide rail 3 in the 3 butt seam region 30 thereof.

Figure 8:
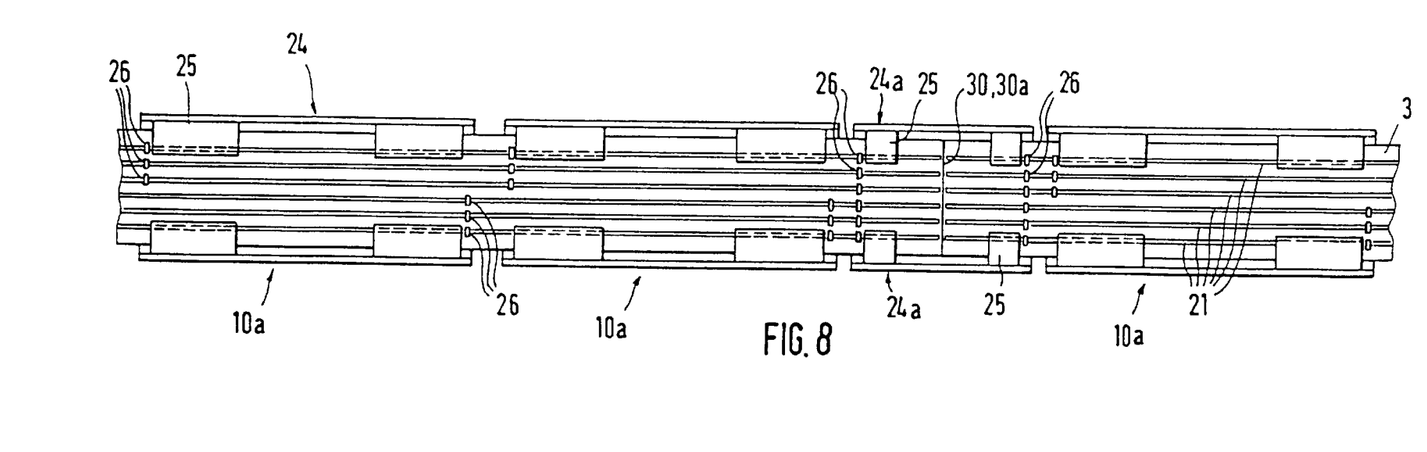
FIG. 8 is a plan view onto the arrangement according to FIG. 7.

Viewing FIGS. 7 and 8 together, it is obvious that, through the co-operation of the conductor strands 21 embedded in the guide rail 3, the fastening means 24, 25 and the contacting elements 26, discrete stator segments can be mounted and electrically connected practically at any desired spacings from one another or at any desired points of the guide rail 3, so as to produce the drive for a rotor device according to boundary conditions and requirements. In the illustrated embodiment three winding starts and three winding finishes may be connected to the six conductor strands 21 via a total of six contacting elements 26 for each stator segment 10a. Each of the six conductor strands 21 is bridged by two contacting elements 26 and an associated bridging conductor 31 between these in the region on each side of the butt seam 30 in order to guarantee an electrical current flow. This arrangement permits a high degree of flexibility, both in the case of the configuration with individual guide rail sections 3a, 3b and when the primary part, in particular the pole pitch of the latter, is of an electrotechnical design.

Figure 9:
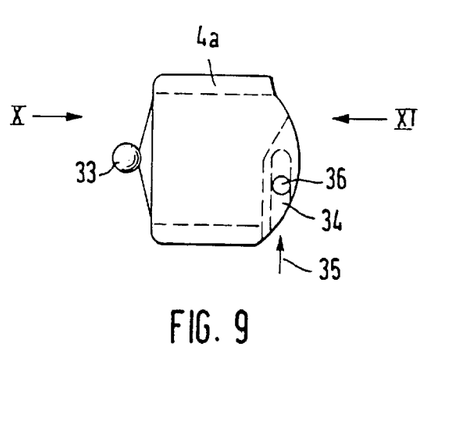
FIG. 9 is a plan view onto a rotor segment with ball-and-socket joint.
Figure 10:
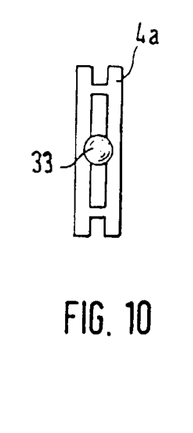
FIG. 10 is a view in the direction X in FIG. 9.
Figure 11:
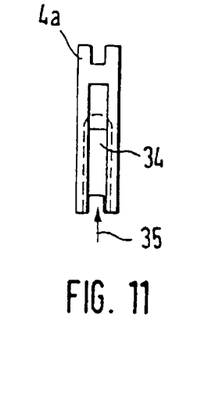
FIG. 11 is a view in the direction XI in FIG. 9.
Figure 12:
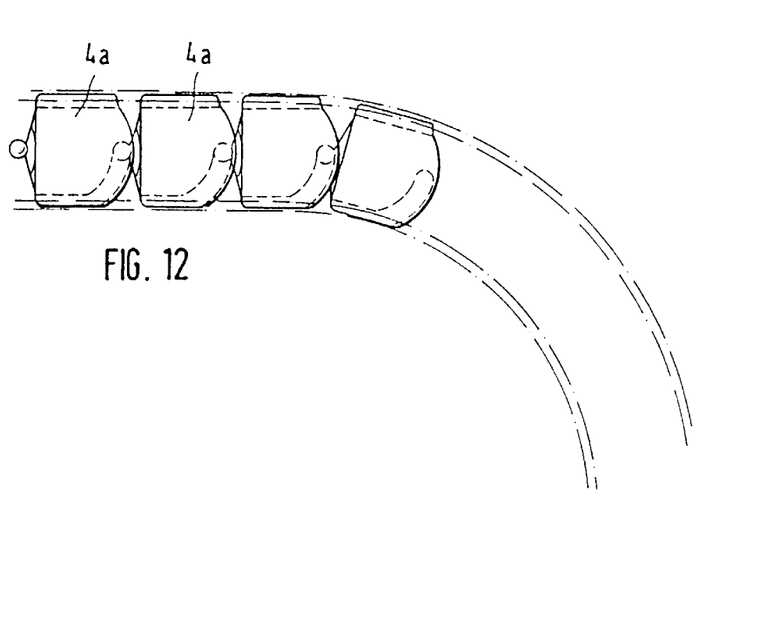
FIG. 12 is a plan view onto a segmented rotor device with different rotor segment geometries, moving along a smoothly curved path.
Figure 13:
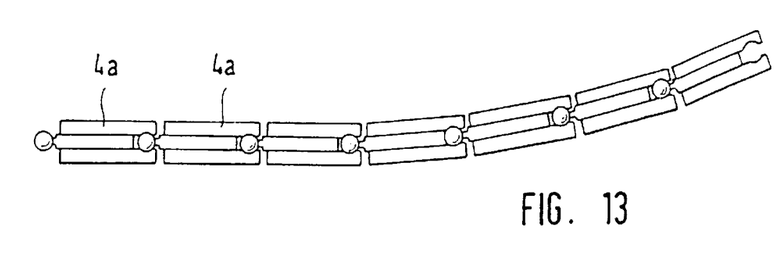
FIG. 13 is a side view onto a rotor device segmented in an articulated manner, moving along a curved path in a plane perpendicular to that in FIG. 12.

According to FIGS. 9–11, the rotor segments 4a are connected together via ball-and-socket joints in order to create a multi-member rotor or secondary part. For this purpose the rotor segment 4a is provided at one end face with a ball end 33 which projects from the end face in order to engage in a complementary, blind hole-type holding space 34 in an adjacent rotor segment. The longitudinal direction of the holding space 34 extends approximately transversely to the direction in which the rotor moves, so that two rotor segments 4a can be joined together by placing the ball end 33 of one rotor segment at the entrance to the holding space 34 and then moving it transversely to the (subsequent) rotor movement direction. The direction in which the ball end is inserted in the holding space 34 is designated by 35. The ball end receiving space 34 may also be penetrated in its transverse direction by a locking pin (not shown), for which a transverse recess 36 leading into the receiving space 34 in the transverse direction is provided. This concept of joining together individual rotor segments 4a via ball-and-socket joints permits a longer row of rotor segments along curved paths in a three-dimensional space, i.e. both along a curved path in a first plane (FIG. 12) and along a curved path in a second plane perpendicular to the first (FIG. 13).

Figures 14, 15:
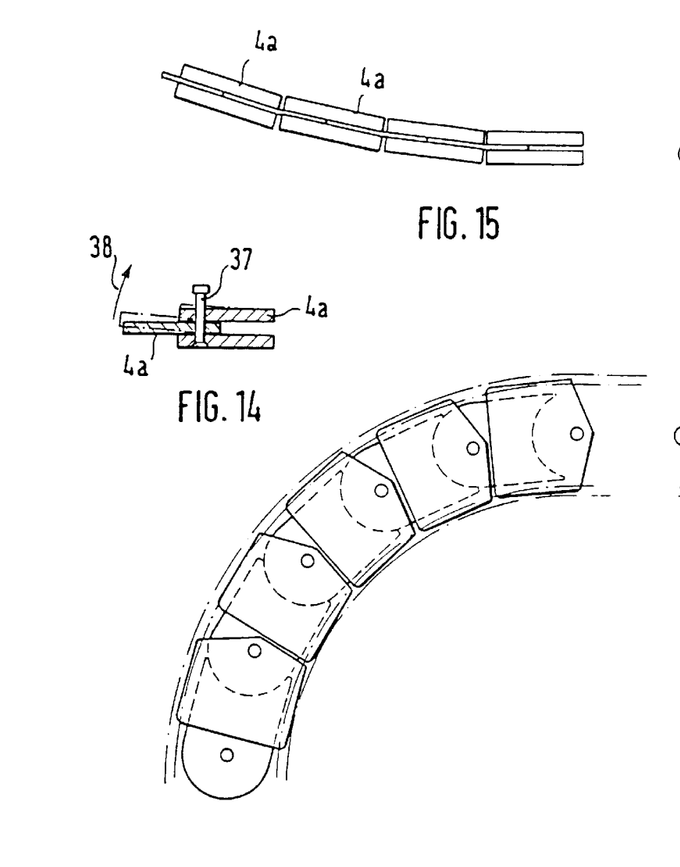
FIG. 14 is a sectional representation of an alternative articulation construction between two rotor segments.
FIG. 15 is a representation corresponding to FIG. 13 of a segmented rotor device, moving along a curved path in a plane perpendicular to that in FIG. 12.

An alternative articulation concept according to FIG. 14 lies in the use of elastic axial pins 37, the longitudinal directions of which may be curved under the action of force. The joined rotor segments 4a, which are both articulated together about a common axial or hinge pin 37, can then be pivoted with respect to one another about an axis (indicated by dot-dash lines and with the pivot direction 38 in FIG. 14) extending perpendicularly to the hinge pin 37. An elastic hinge pin 37 of this kind could be formed by means of a helical spring. FIG. 15 shows how this articulation concept also enables slopes to be covered, at least to a slight extent.

Figures 16, 17:
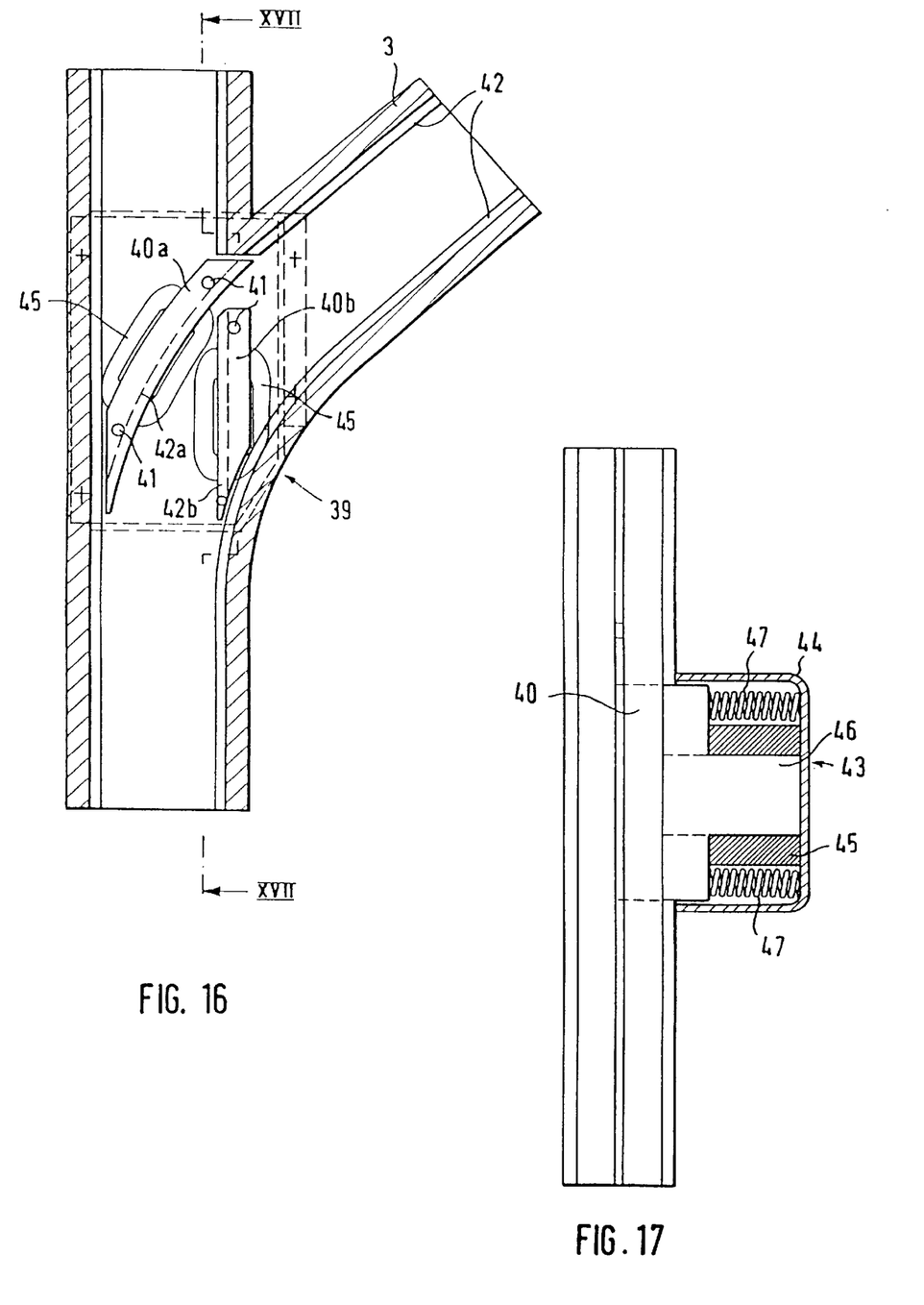
FIG. 16 is a plan view onto a set of points of the guide rail.
FIG. 17 is a sectional representation along the line XVII—XVII in FIG. 16.

According to FIGS. 16 and 17, the guide rail 3 of the apparatus according to the invention is provided with at least one switchable set of points 39 to provide a change of direction or track for the secondary part connected to conveyor elements. This is subdivided, inter alia, into first and second track sections 40a, 40b, which determine the direction. These are mounted within the guide rail or in the points region 39 such that they can be displaced along a points shifting guide 41 in a direction which is perpendicular to the basal plane and plane of movement of the guide rail 3 and to the drawing plane of FIG. 16. If the track of a rotor carriage is to follow a curvature to the right with respect to the previous straight-ahead travel, the first track section 40a is to be shifted upwards in the guide rail 3 to an extent such that its track bearing surface 42a lies flush with or at the same level as the other track bearing surface 42 of the guide rail 3. The second track section 40b of the points 39 is at the same time to be shifted downwards in the guide rail 3 to an extent such that its track bearing surface 42b cannot impart any direction-determining forces to the rotor carriage. If the track direction is to be switched over from a right-hand curve to straight-ahead travel, the procedure to be followed is exactly the reverse, i.e. the first track section 40a is to be drawn with its track bearing surface 42a into the guide rail 3, while the second track section 40b is to be raised with its track bearing surface 42b from its retracted original position into the active position, so that its track bearing surface 42b can engage with the rotor carriage so as to impart a direction. The first or second track section 40a, 40b is in each case shifted by means of an electromagnet 43, which is accommodated in a switch box 44 and formed by a coil 45 and a soft magnet 46 around which the latter is wound. Upon exciting the electromagnet 43, the respective track section 40a, 40b of the points 39 is pulled more or less like an armature against the force of spring elements 47 into the inactive original position sunk into the guide rail 3. If the respective track section 40 is to be shifted into its direction-determining position, the electromagnet 43 is switched off or de-energized, so that the spring elements 47 push the respective track section or armature 40 upwards out of the base region of the guide rail 3, so that the respective track bearing surface of the points 39 lies at the same level as the other track bearing surface of the guide rail 3.

Figures 18, 21:
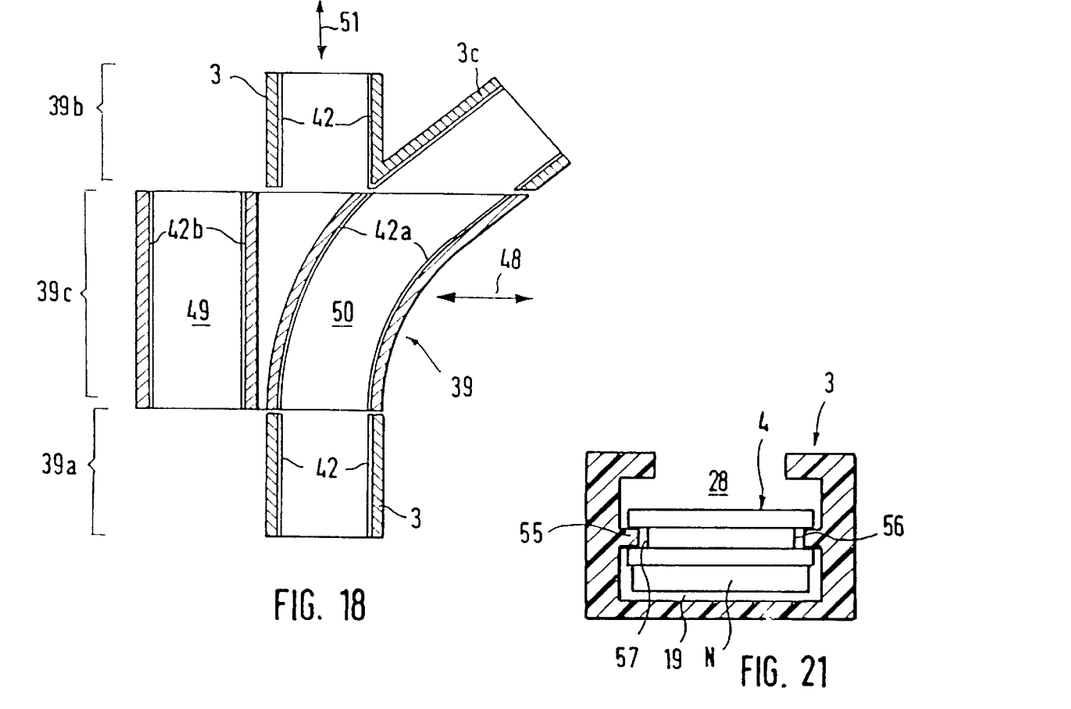
FIG. 18 is a plan view onto an alternative form of points for the guide rail of the apparatus according to the invention.
FIG. 21 is a cross section of the guide rail of the apparatus according to the invention with sliding guide.

An alternative form of a set of points 39 is described on the basis of FIG. 18: It is subdivided into two stationary sections 39a and 39b, one—39b—of which has a V-type structure for track branching. A central section 39c extends between these such that it can be shifted to-and-fro in the linear direction 48. An electric linear drive may be used, for example, for this linear shifting movement. The displaceable central section 39c is provided with two guide rail segments 49, 50 which extend separately from one another, one of them in a straight line and the other in a curved manner. In the position shown in FIG. 18 the curved guide rail segment 50 is active, i.e. it connects the bottom points section 39a to a guide rail section 3c diverging obliquely from the straight-ahead travel 51. If the points 39 are to be switched over from curved travel to the right to straight-ahead travel 51, the central points section 39c is to be moved in linear fashion (in FIG. 18) to the right until the track bearing surfaces 42b of the straight guide rail segment 49 are in alignment with the track bearing surfaces 42, which extend in the straight-ahead direction 51, of the straight guide rails parts of the points 39.

Figure 19:
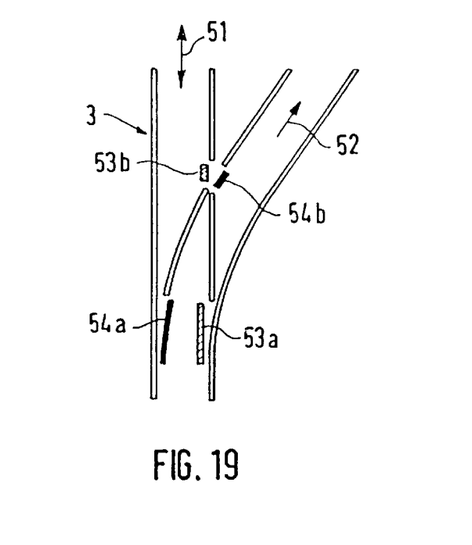
FIGS. 19 and 20 are diagrammatic plan views onto another points construction, with the track direction for the guide rail of the apparatus according to the invention set differently in each case.
Figure 20:
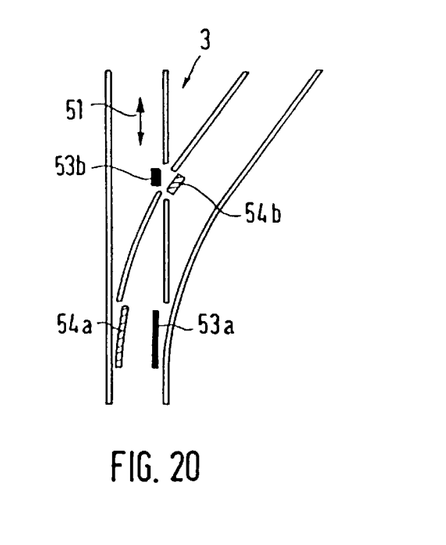

According to FIGS. 19 and 20, rigid points or points which cannot be mechanically changed can also be used for the apparatus according to the invention: If the rotor carriage is to follow a curved direction of travel 52 diverging to the right in the guide rail 3 according to FIG. 19, the soft electromagnets 53a, 53b, which correspond to the straight-ahead travel 51 and lie in linear alignment, are switched into the inactive state, while the soft electromagnets 54a, 54b, which lie in curved alignment with one another in accordance with the curved travel 52, are excited. A rotor carriage is thus pulled magnetically into the track of the guide rail 3 for curved travel 52. This applies conversely and with the appropriate changes for the straight-ahead travel according to FIG. 20, for which the soft electromagnets 54a, 54b associated with the curved travel 52 are switched into the inactive state and the soft electromagnets 53a, 53b associated with the straight-ahead travel 51 are switched into the active state. The soft electromagnets may also be formed by means of individual, appropriately controlled stator elements or segments of the primary part of the electric linear drive.

As an alternative to the constructions described above according to FIGS. 3 and 4, FIG. 21 shows a guide rail 3 for the apparatus according to the invention whose cross-sectional profile can be produced entirely and in one piece from a plastics material. The rotor carriage 4 is held in its interior space 28 and borne by opposite slide shoulders 55, which projects inwards from the laterally opposite inner walls of the guide rail 3 towards the interior space 28. They are held or engaged in longitudinal side grooves 56 of a complementary shape, preferably with slight transverse play 57, in the rotor carriage 4. This provides a certain transverse mobility parallel to the plane of the direction of travel, whereas the position of the rotor carriage 4 perpendicularly to the plane of the direction of travel or the air gap 19 is fixed. This type of rotor sliding guide in the guide rail 3 can be achieved with minimal manufacturing expenditure and construction components.

We claim:

1. A conveying apparatus for transporting material along a machine for processing the material, the conveying apparatus comprising:

(a) at least one conveyor element formed for engagement with the material;

(b) a guide rail, along which the conveyor element can move, the guide rail being formed from a non-magnetic, electrically insulating material, having conductor strands formed therein;

(c) a drive device including an electric linear motor having a secondary rotor part mounted to the conveyor element in order to convey the material via the conveyor element and a primary stator part mounted in a stationary manner to the guide rail and electrically connected to the conductor strands for energizing the stator part, the guide rail extending at least partly in the gap between the stator part and the rotor part; and (d) at least one lock-in fastener having contacting elements associated therewith, for fastening the stator part and the guide rail together, the contacting elements registering in association with the conductor strands of the guide rail to form the electrical connection.

2. An apparatus in accordance with claim 1 wherein the guide rail has a C-shaped open profile in cross section, in which the secondary rotor part is held in a mobile manner.

3. An apparatus in accordance with claim 1 wherein the guide rail has channel-like cavities in its interior space for containing the conductor strands.

4. An apparatus as claimed in claim 1, wherein the stator part has at least one winding to be energized, the contacting elements terminating stator windings and arranged to be brought into engagement with the conductor strands of the guide rail when the fastener is engaged to establish an electrical connection with the at least one stator winding.

5. An apparatus as claimed in claim 1, wherein the at least one lock-in fastener is structurally integrated with the stator part and formed with projecting resilient snap hooks for engaging the guide rail.

6. An apparatus as claimed in claim 1, wherein the contacting element is an insulation displacing terminal for cutting through the insulating guide rail material into electrical contact with the conductor strand.

7. An apparatus in accordance with claim 1 or 2 or 3 or 4 or 5 or 6 wherein the guide rail is composed of a plurality of individual sections which adjoin one another in a row and which between them form a butt joint, wherein a respective separate fastener with contacting elements extends on both sides of the butt joint, and the contacting elements are electrically connected by bridging conductors on different sides of the butt joint.

\* \* \* \* \*